Sept. 5, 1961 H. H. CHASE 2,999,219
PLUG-IN POWER BUSWAY
Filed Oct. 23, 1958
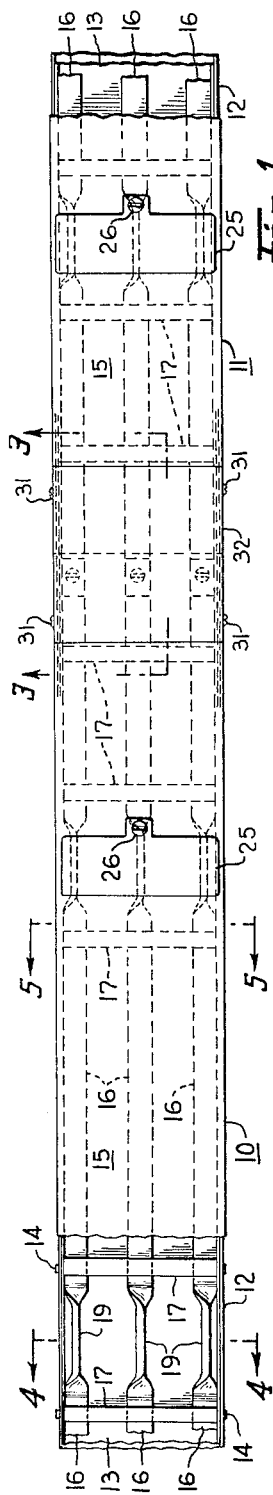
Fig.1
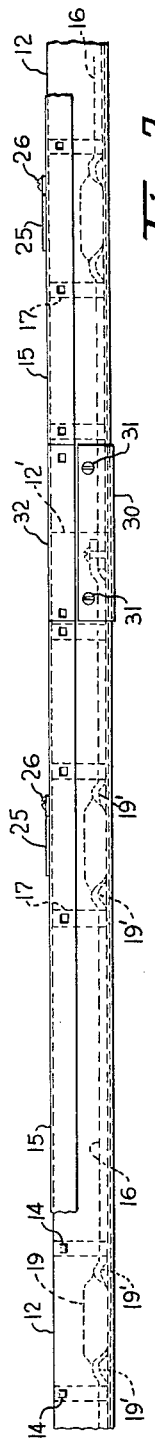
Fig.2
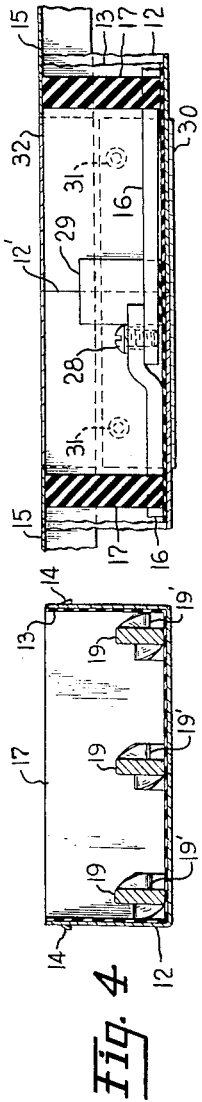
Fig.3
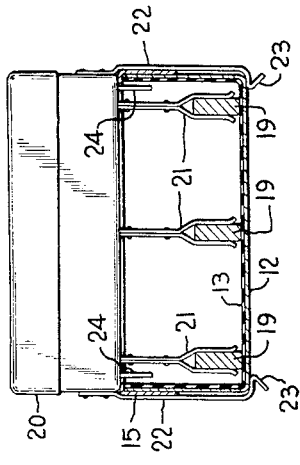
Fig.6
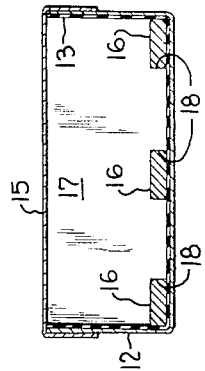
Fig.4
Fig.5
INVENTOR.
HENRY HAMILTON CHASE
BY Robert F. Casey
ATTORNEY //  
United States Patent Office 2,999,219  
Patented Sept. 5, 1961

2,999,219
PLUG-IN POWER BUSWAY
Henry H. Chase, Keene, N.H., assignor to General Electric Company, a corporation of New York
Filed Oct. 23, 1958, Ser. No. 769,110
5 Claims. (Cl. 339—22)

My invention relates to electric power busway systems of the type adapted to receive plug-in type power take-off devices.

Electric power busway systems of the plug-in type constructed according to the prior art are relatively expensive, especially in comparison with the alternative method of wiring comprising the use of metallic conduit and wire therein. The relatively high cost of such busways results partly from the amount of material required to provide adequate electrical spacing and to physically reinforce such bus bars against the distorting forces existing during short-circuit current conditions. Furthermore, the relatively poor thermal transfer existing between such bus bars and the housing in prior art busway systems has required the use of bus bars of relatively large cross-sectional area so as to prevent the occurrence of undesirably high temperatures.

It is an object of the present invention to provide a busway system having the bus bars disposed and arranged to give optimum performance as regards resistance to deformation due to magnetic forces existing in short-circuit current conditions, and at the same time disposed to provide effective plug-in connection with power take-off devices.

It is a further object of the invention to provide a plug-in type busway system having bus bars which are relatively closely spaced together to reduce total reactance of the system but which provide adequate through-air electrical clearance at plug-in points.

It is a further object of the invention to provide a plug-in type busway power system which has an optimum thermal transfer between the bus bars and the outer busway enclosure.

In accordance with the invention, there is provided a plug-in type power busway system including an elongated outer enclosure and a plurality of elongated parallel bus bars supported therein in spaced relation. The bus bars are of flat strap or strip-like construction and are disposed with their relatively wide surfaces in a substantially common plane throughout the major intermediate portions of each section, to provide maximum resistance to deformation in a direction transversely thereof due to short-circuit current forces. The bus bars also have longitudinally spaced portions thereof twisted so that the wide surfaces thereof extend generally perpendicular to the common plane of the intermediate portions to provide portions which can be readily plugged onto by contacts of a plug-in type power take-off device, providing good contact area and also providing maximum through-air electrical clearance between such plug-in type power take-off device contacts. The bus bars at the ends of each busway section are again disposed in flatwise alignment in a relatively common plane to facilitate their interconnection with similar ends of another busway section. In order to provide optimum thermal transfer between the bus bars and the housing, the bus bars are mounted directly against the back wall of the enclosure with only a thin layer of insulating material therebetween.

The invention itself in one specific embodiment will be clearly understood by reference to the following detailed description taken in conjunction with the accompanying drawings. The scope of the invention will, however, be particularly pointed out in the appended claims.

FIGURE 1 is a top plan view of a portion of a busway system incorporating the subject invention, and showing portions of two interconnected busway sections;

FIGURE 2 is a side elevation view of the busway system of FIGURE 1;

FIGURE 3 is a sectional view taken on the line 3—3 of FIGURE 1;

FIGURE 4 is a sectional view taken on the line 4—4 of FIGURE 1, the cover being omitted;

FIGURE 5 is a sectional view taken on the line 5—5 of FIGURE 1, the cover being shown in place;

FIGURE 6 is a sectional view showing a plug-in type power take-off device in mounted engagement on the busway of FIGURE 1.

In the drawing, the invention is shown as incorporated in a busway system including two interconnected busway sections 10 and 11.

Each busway section 10 and 11 comprises an outer enclosure including an elongated duct having a main body portion 12 which is generally U-shaped in cross-section and is constructed of a suitable metallic material such as steel or aluminum. The body portion 12 has its interior surface lined with a suitable insulating sheet material 13. The side walls of the body 12 are provided with lanced-out locking projections 14 adapted to be received in correspondingly positioned openings in a channel-shaped cover member 15 to retain the cover in place.

Three elongated conductive bus bars 16 are supported in parallel relation within the housing 12 with their major intermediate portions in intimate flatwise engagement with the insulating sheet covering 13, as shown in FIGURE 5. The bus bars 16 are retained in place against the back wall of the enclosure 12 by means of a plurality of longitudinally spaced insulating spacing and supporting members 17. The insulating members 17 each comprise a block of insulating material of high strength such, for example, as a fibre-reinforced plastic compound or a plastic-resin-impregnated wood body. The spacer 17 is of such dimension as to completely fill the inner cross-sectional area of the busway enclosure with the exception of the notches 18 for the bus bars, and the duct design is such that when the cover is put in place it exerts a pressure against the bus bars, pressing them against the insulating sheet material 13. Intimate thermal contact is thereby established and maintained between the bus bars and the outer housing. To further facilitate this thermal transfer, the sheet insulating material 13 is preferably bonded to the metallic enclosure 12 throughout its contacting area by suitable means such as by a plastic bonding resin.

For the purpose of facilitating the plugging-in of power take-off devices, the bus bars 16 have longitudinally spaced portions 19 thereof twisted so that their major flat surfaces extend in a direction perpendicular to the common plane of the flat surfaces of the intermediate portions. Thus, the portions 19 of the strap-like bus bars 16 are disposed edgewise with respect to the wide or transverse dimension of the enclosure. The bus bars 16 are also given a slight offset bend 19′ at each side of the portions 19 so that one edge of each of the portions 19 lies in the same plane as one of the flat surfaces of the intermediate portion of the bar, i.e., against the insulating sheet 13.

The insulator supports 17 are preferably disposed relatively close to the twisted portions 19 to provide a rigid support for these portions.

For the purpose of taking electric power from the bus bars 16 at the portions 19, a plug-in type power take-off device 20 is provided having a plurality of sets of contact jaws 21 projecting from the rear surface thereof. The power take-off device 20 also includes a pair of projecting mounting members 22 of resilient material having inturned end portions 23 which snap over the enclosure 12 to releasably retain the power take-off device thereon.

The power take-off device 20 also includes a pair of short metallic grounding contact members 24 which contact edge portions of the housing cover 15 to connect or ground the enclosure of the plug-in device 20 to the enclosure 12. The housing cover 15 is provided with a plurality of longitudinally spaced openings extending transversely of the busway and being normally closed by opening cover members 25 mounted on the cover 15 by suitable means such as by screw 26. When it is desired to insert a plug-in type power take-off device at any particular opening, the corresponding screw 26 is loosened and the opening cover 25 is rotated 180 degrees to a position where it exposes the corresponding opening, and the screw 26 is then tightened to retain the cover in this position.

The housing cover members 15 are terminated short of the end of the enclosure body 12, at both ends. Thus, housing members 12 of each section meet in end-to-end abutting relation as at the line 12'.

The bus bars 16 are provided with overlapping end portions, one set of such bus bars being provided with an offset to overlap the other set and being provided with a clearance hole to receive a connecting screw 28 to threadedly engage in the corresponding end of the adjacent bus bar to connect the bus bars together. It will be observed that the ends of the bus bars 16 at the joint connection are maintained in flatwise engagement relation to the bottom wall of housing 12. This permits the use of a simple fastening device such as the screw 28 which may be operated from the outside of the enclosure readily when the cover portion 32 is removed.

For the purpose of connecting the housing members 12 together, housing and enclosing means is provided comprising a generally channel-shaped housing splice plate 30 adapted to overlie the adjacent end portions of both housings 12 and connected thereto by screws 31. A cover splice plate 32 is also provided, overlying adjacent side wall portions of the housing 12 and having openings to receive correspondingly positioned projections 14.

While I have disclosed only one specific embodiment of the invention, it will be readily apparent that many modifications thereof may be made, and I therefore intend by the appended claims to cover all such modifications as fall within the true spirit and scope of the invention.

What I claim as new and desire to secure by Letters Patent of the United States is:

1. An electric power plug-in busway system comprising an elongated enclosure of generally rectangular cross section, and a plurality of relatively wide, thin, flat bus bars supported in edge-to-edge spaced relation in said enclosure with their relatively wide surfaces in a substantially common plane throughout the major intermediate portions of said conductors, said bus bar conductors having a plurality of longitudinally spaced intermediate portions thereof twisted at 90 degrees to said common plane with the twisted portions having uninsulated parts, said enclosure having openings adjacent the twisted portions for permitting insertion of contacts of a plug-in type power take-off device making plug-in contact with the uninsulated parts of said twisted portions.

2. An electric power busway system comprising an elongated enclosure of generally rectangular cross section, a plurality of elongated generally wide, thin, flat bus bar conductors supported in spaced edge-to-edge relation in said enclosure with their relatively wide surfaces in a substantially common plane throughout the major intermediate portions of said conductors, the said major intermediate portions being in intimate thermal contact but electrically insulated from a wall of said enclosure, and clamping means pressing said bus bar conductors against said wall, said bus bar conductors having longitudinally spaced portions thereof twisted at 90 degrees to the plane of said wall, said enclosure having an opening adjacent said twisted portions for permitting insertion of contacts of a plug-in type power take-off device making plug-in contact with said twisted portions.

3. An electric power busway system comprising an elongated enclosure of generally rectangular cross section having relatively wide top and bottom walls and relatively narrow side walls, said top wall being removable, a plurality of relatively wide, thin, flat bus bars supported in spaced edge-to-edge relation in a common plane within said enclosure with the major intermediate portions thereof in intimate thermal contact but electrically insulated from said bottom wall of said enclosure, a plurality of longitudinally spaced insulating members each having its peripheral dimensions corresponding to the inner cross-sectional dimensions of said enclosure whereby said insulating member is adapted to fit closely within said enclosure, said insulator having portions thereof cut away to closely fit around said bus bars to restrict lateral movement thereof, the dimension of said insulating members in the direction between said top and bottom cover members being such as to hold said intermediate portions of said bus bars in intimate thermal contact with said bottom wall of said enclosure.

4. An electric power busway system comprising an elongated metallic housing of generally rectangular cross section, said housing having relatively wide top and bottom walls and relatively narrow side walls, said top wall being removable, insulating means on and tightly bonded to said bottom wall and at least portions of said side walls, a plurality of elongated, parallel, generally wide, thin, flat bus bar conductors supported in spaced edge-to-edge relationship in a common plane within said housing and having the wide dimension of major intermediate portions thereof in intimate contact with said insulating coating on said bottom wall, and insulator means within said enclosure retaining said bus bar conductors in intimate contact with said bottom wall, said bus bar conductors having longitudinally spaced portions thereof twisted at 90 degrees to the general plane of said bottom wall to present portions thereof edgewise with respect to said top wall, said twisted portions having at least a portion thereof uninsulated, said top wall having openings adjacent said uninsulated portions to provide access for contact members of a plug-in type power take-off device.

5. An electric power busway system as set forth in claim 4 wherein said busway system comprises prefabricated longitudinal sections, the bus bar conductors in each section thereof terminating in exposed contact portions at the end of said section, said contact portions being disposed in a plane generally parallel to said bottom wall.

References Cited in the file of this patent
UNITED STATES PATENTS

| | | |
|---|---|---|
| 1,132,673 | Murray | Mar. 23, 1915 |
| 2,088,105 | Frank et al. | July 27, 1937 |
| 2,186,377 | Frank | Jan. 9, 1940 |
| 2,287,502 | Togesen et al. | June 23, 1942 |
| 2,318,860 | Huguelet | May 11, 1943 |
| 2,359,247 | Rowe | Sept. 26, 1944 |
| 2,495,526 | King | Jan. 24, 1950 |
| 2,786,152 | Fisher | Mar. 19, 1957 |